Sept. 20, 1966    T. W. SHORT    3,274,305
METHOD OF FORMING CONCRETE ROOFS
Filed Oct. 22, 1965    2 Sheets-Sheet 1
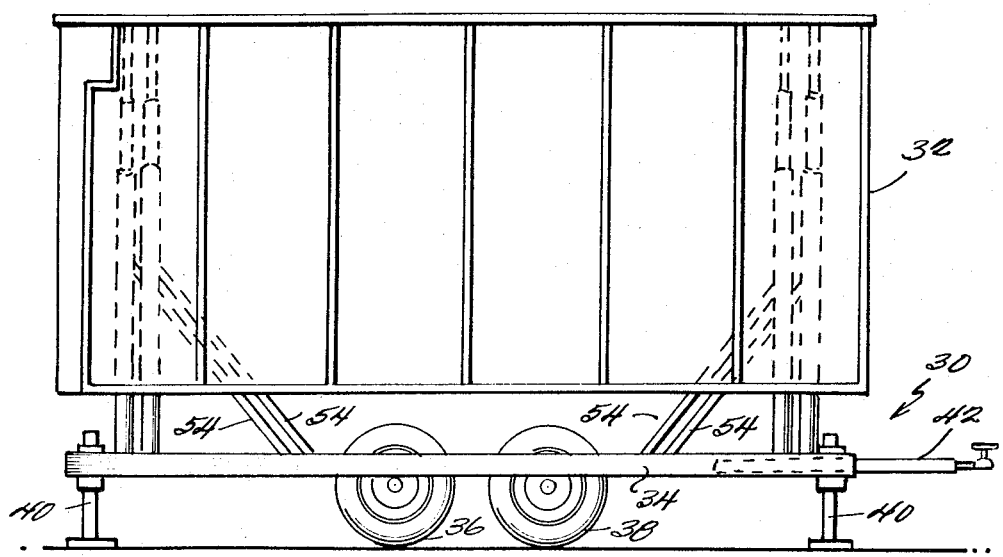
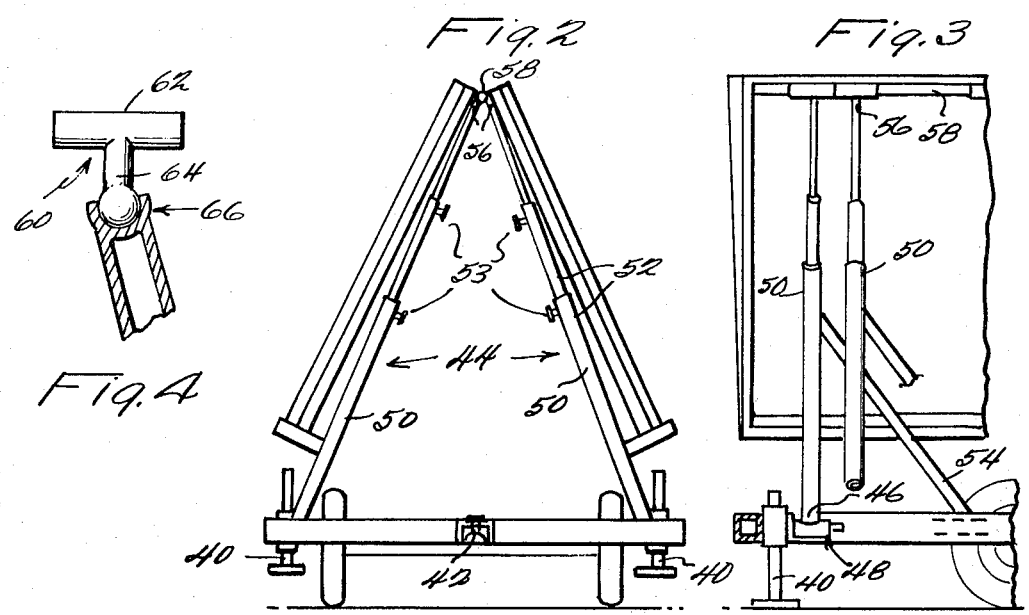
INVENTOR
THOMAS W. SHORT
BY Cushman, Darby & Cushman
ATTORNEYS Sept. 20, 1966  T. W. SHORT  3,274,305
METHOD OF FORMING CONCRETE ROOFS
Filed Oct. 22, 1965  2 Sheets-Sheet 2
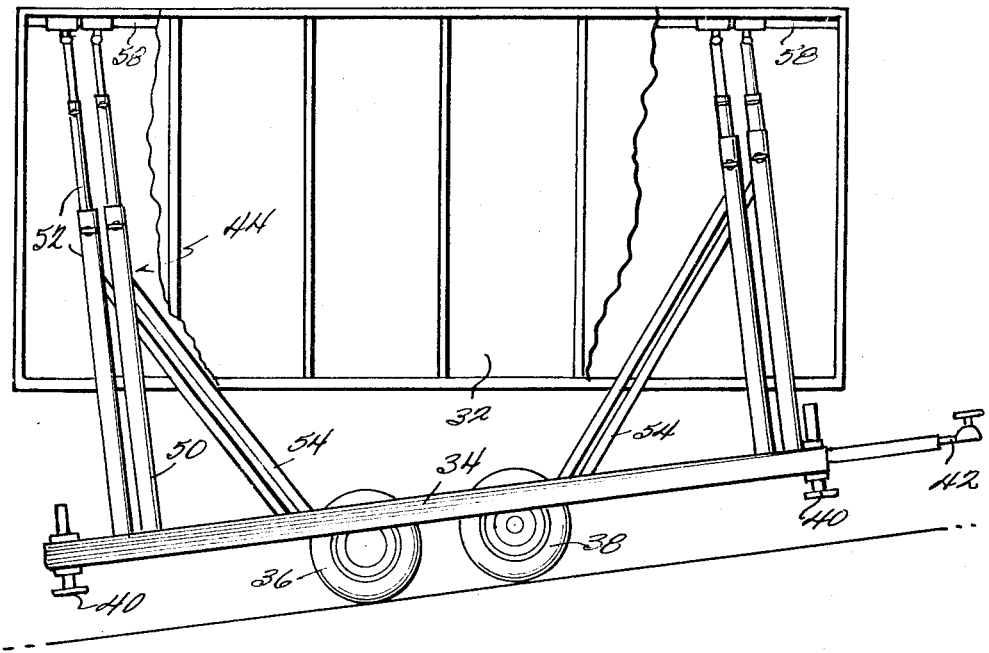
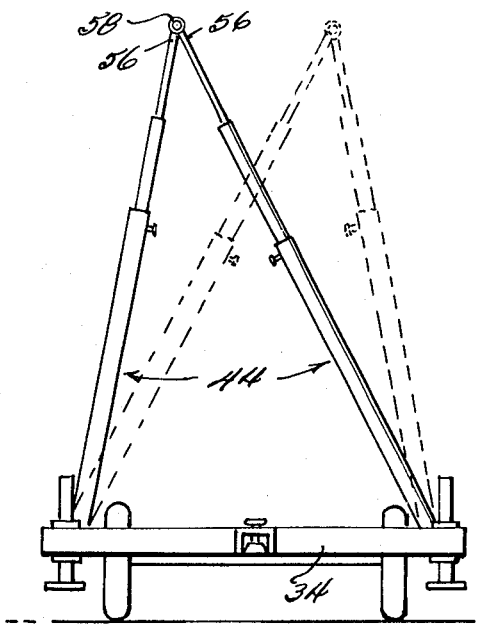
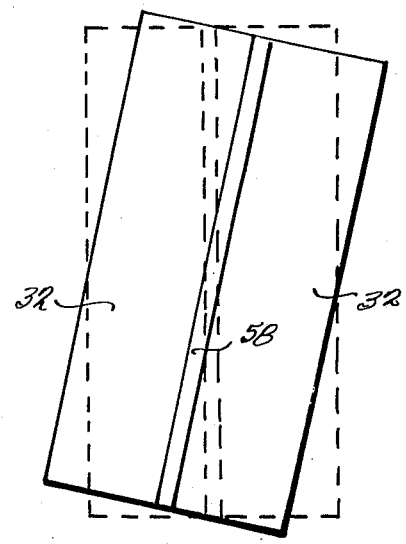
INVENTOR
THOMAS W. SHORT
BY Cushman, Darby & Cushman
ATTORNEYS 3,274,305
METHOD OF FORMING CONCRETE ROOFS
Thomas W. Short, Realty and Trust Bldg.,
Kerrville, Tex.
Filed Oct. 22, 1965, Ser. No. 501,277
8 Claims. (Cl. 264—31)

This application is a continuation-in-part of my copending application, Serial No. 365,548, filed April 16, 1964, which was a division of my copending application, Serial No. 218,901, filed August 23, 1962.

This invention relates to an improved method for forming thin-shell roofs and other concrete roof constructions and more particularly to an improved method for handling forms whereby the central axis of such forms can be realigned vertically and laterally once the structure from which the forms are supported is in a set position.

By employing a trailer having a pair of longitudinally disposed upwardly extending support members, the upper ends of which are adjustable independently of each other in both a vertical and lateral direction, and a bar extending therebetween with roof forms depending therefrom, the old method of forming a concrete roof comprising the steps of moving the trailer to the building site, supporting it, raising the roof forms, and pouring the concrete thereon has been greatly improved by providing the steps of laterally adjusting with respect to the trailer the upper end of at least one support member independently of the upper end of the other support member so as to laterally align the central axis of the roof forms as defined by the longitudinal bar irrespective of the lateral misalignment of the trailer at the building site and vertically adjusting with respect to the trailer the upper end of at least one support member independently of the upper end of the other support member so as to vertically align the central axis of the roof forms as defined by the longitudinal bar irrespective of the vertical misalignment of the trailer at the building site.

The importance of this improvement will be appreciated when the difficulties in aligning the longitudinal axis of the trailer are considered. Heretofore, the final central axis of the roof forms has been somewhat dependent on the alignment of the trailer axis. The alignment of the trailer axis often becomes time-consuming and costly because of obstacles such as the natural terrain and the like. Generally speaking, the terrain has preferably been cleared and graded prior to the erection of any roof construction; consequently, it is assumed that the ground is reasonably level. However, if it is necessary to overcome certain problems relating to the natural terrain, the novel method presented herein provides for the vertical adjustment of the upper end of each support member independently of the upper end of the other support member. Accordingly, this method enables the longitudinal support bar, the central axis of the roof forms, and the roof forms themselves to be vertically aligned independently of the axis of the trailer.

A far more difficult task is encountered, however, in aligning the central axis of the trailer laterally. Quite often it is necessary to back the trailer into a building site due to obstacles, but the inherent difficulty of backing a trailer again presents a formidable alignment task resulting in lost time and money. The method provided herein enables the builder to adjust laterally the longitudinal bar by laterally adjusting the upper end of each support member independently of the other upper end, it being apparent that the upper ends of the support members and the bar extending therebetween define the central axis of the roof forms.

These and other objects of this invention are more clearly depicted in the following detailed description having specific reference to the attached drawings, not to limit the scope of the invention in any respect but so that the principles thereof might be more clearly demonstrated.

In the drawings:

FIGURE 1 is a side elevation view of a roof-form trailer;

FIGURE 2 is a front elevation view of the trailer of FIGURE 1 with the stabilizing supports in a raised position;

FIGURE 3 is a broken-out longitudinal section view of the rear of the trailer;

FIGURE 4 is a fragmentary view, partly in section, of the upper end of the telescoping legs;

FIGURE 5 is a side elevation view of the trailer with parts broken away for clarity showing the vertical realignment of the roof forms;

FIGURE 6 is a schematic front view of the trailer showing the manner of lateral adjustment of the upper ends of the support members; and FIGURE 7 is a schematic plan view of the trailer with the roof forms in a raised position and showing the manner of lateral adjustment of the roof forms.

Referring to FIGURES 1–3, there is shown a trailer 30 of generally rectangular configuration. Roof forms 32 are supported on the trailer in a manner which will be presently explained. The trailer preferably comprises a rectangular frame 34, in plan view, to which is joined two sets of wheels, 36 and 38, in the usual manner. At each of its corners the frame 34 carries stabilizing supports 40. The forward end of the frame 34 is provided with a retractable trailer hitch 42 by which the trailer can be attached to a vehicle and moved to a construction site. The trailer has a pair of longitudinally disposed, upwardly extending support members 44 operatively secured at their bases 46 to the trailer. As shown in FIGURE 3 the upwardly extending support members are pivotally connected, as at 48, to the rectangular frame 34 of the trailer.

As further illustrated, the upwardly extending support members comprise a pair of telescoping legs 50 which have an inverted V-shape configuration with the free ends or bases 46 of the legs attached to the trailer. Each leg 50 comprises a plurality of telescoping sections 52 fixedly positioned relative to one another by any common means, such as a clamping screw 53. Preferably, angularly extending supporting struts 54 are connected at their upper ends to the upwardly extending legs of the support members and pivotally connected at their lower ends to the frame in a manner similar to the connection of the legs of the support members. The upper ends 56 of the support members, or apex of the V-shaped configuration, support a bar 58 which extends longitudinally between the upper ends 56 of the support members 44. As shown more particularly in FIGURE 4, each upper end of the legs of the support members comprises a T-shaped pipe 60 adapted to receive the longitudinal bar 58 through its cross member 62 while the stem 64 of the T-shaped member is swivelly connected, as at 66, to the upper telescoping section 52 of the associated leg 50.

A pair of roof forms 32 are pivotally connected to the longitudinal bar 58, and, in their transporting position, depend from the longitudinal bar on opposite sides of the upwardly extending support members 44. These roof forms are adapted to be raised to any desired elevation thereby defining a roof configuration. Cement is then poured on the roof forms and allowed to harden before the forms are removed. It will be seen, therefore, that the longitudinal bar determines the central axis of the roof forms not only with respect to its vertical deviation from a horizontal relationship with the ground but also with respect to lateral deviation in relation to a fixed axis, such as the longitudinal axis of the trailer.

In operation, the apparatus described above enables a unique method to be employed in erecting the roof forms. The trailer is transported to a building site with the roof forms in a collapsed transporting position. The trailer is stably supported on the ground at the building site by the stabilizing supports 40. The support members can then be adjusted deepnding on the misalignment needed to be corrected.

As shown in FIGURE 5, the ground on which the trailer sits is somewhat unlevel with respect to a horizontal plane. Consequently, by lengthening both legs of the left support member relative to the right support member, the longitudinal bar can be brought to the desired vertical elevation at each end, thereby defining a horizontal axis or any other predetermined axis.

On the other hand, lateral adjustments may be needed to laterally align the roof forms. FIGURES 7 and 8 disclose one type of lateral adjustment which can be made to the support member. In FIGURE 7, for instance, the right leg has been lengthened relative to the left leg thereby canting the upper end or apex 56 of the support member to one side, namely, to the left, of its normal center position while the base of the support member remains stationary. The upper end of the other support member can remain stationary or be moved in either direction. As illustrated in FIGURE 8, it was moved in the opposite direction to that of the first or near end. The various lateral adjustments are infinite. Angular as well as parallel deviations from the axis of the trailer can be made.

Once the alignment of the longitudinal bar and central axis of the roof forms is determined, the roof forms, while supported at least partially from the trailer, can be moved upwardly into extended positions of support. Moreover, further adjustment can be made after the forms are erected. It will be appreciated, moreover, that it is within the scope of the invention to erect the roof forms prior to any adjustments and then make the necessary adjustments.

Once the roof forms are erected, concrete is poured on their upper surfaces to form a roof having a shape conforming to the roof forms. Often the edges of the roof forms must be built up before the concrete is poured. Once the concrete has hardened, the roof forms can be lowered and the trailer pulled away. In most concrete construction, reinforcing rods are also laid before the concrete is poured on the roof forms.

While a preferred form of the invention has been illustrated in the drawings and discussed above, it should be adequately clear that considerable modification may be made thereto without departing from the principles of the invention. Therefore, the foregoing should be considered in an illustrative sense rather than a limiting sense, and accordingly the extent of this invention should be limited only by the spirit and scope of the claims appended hereto.

I claim:

1. A method of forming a concrete roof by means of a trailer having a pair of longitudinally disposed upwardly extending support members operatively secured at their bases to the trailer and having a longitudinal bar extending between the upper ends of the support members with a pair of roof forms pivotally connected to the longitudinal bar wherein the roof forms assume a predetermined axis irrespective of the alignment of the trailer with respect to that axis comprising steps of:

transporting the trailer to a building site with the roof forms in a collapsed transporting position operatively and pivotally connected to the trailer, the axis of the trailer being disposed from the predetermined central axis of the roof forms;

stably supporting the trailer on the ground;

laterally adjusting with respect to the trailer the upper end of at least one support member independently of the upper end of the other support member so as to laterally align the central axis of the roof forms as defined by the longitudinal bar irrespective of the lateral misalignment of the trailer at the building site;

supporting the roof forms on the trailer while moving the roof forms into an upwardly extended position of support; and pouring concrete on the upper surface of the roof forms to form a concrete roof.

2. The method as defined in claim 1 comprising the additional step of retaining the base of each support member in a set position in relation to the trailer while laterally adjusting the upper end thereof.

3. The method defined in claim 1 additionally comprising the step of vertically adjusting with respect to the trailer the upper end of at least one support member independently of the upper end of the other support member so as to vertically align the central axis of the roof forms as defined by the longitudinal bar irrespective of the vertical misalignment of the trailer at the building site.

4. The method defined in claim 1 additionally comprising the steps of laying reinforcing rods on the upper surface of the roof forms prior to pouring the concrete.

5. The method as defined in claim 1 comprising the additional step of building up the peripheral edges of the roof forms for containing concrete prior to pouring the same.

6. In a method of forming a concrete roof with a trailer having a pair of longitudinally disposed upwardly extending support members operatively secured at their bases to the trailer and having a longitudinal bar extending between the upper ends of the support members with a pair of roof forms pivotally connected to the longitudinal bar wherein the roof forms assume a predetermined axis irrespective of the alignment of the trailer with respect to that axis and including the steps of transporting the trailer to a building site with the roof forms in a collapsed transporting position operatively and pivotally connected to the trailer, the axis of the trailer being disposed from the predetermined central axis of the roof forms, stably supporting the trailer on the ground, supporting the roof forms on the trailer while moving the roof forms into an upwardly extended position of support, and pouring concrete on the upper surface of the roof forms to form a concrete roof, the improvement comprising:

laterally adjusting with respect to the trailer the upper end of at least one support member independently of the upper end of the other support member so as to laterally align the central axis of the roof forms as defined by the longitudinal bar irrespective of the lateral misalignment of the trailer at the building site.

7. The improvement defined in claim 6 additionally comprising the step of retaining the base of each support member in a set position in relation to the trailer while laterally adjusting the upper end thereof.

8. The improvement defined in claim 6 additionally comprising the step of vertically adjusting with respect to the trailer the upper end of at least one support member independently of the upper end of the other support member so as to vertically align the central axis of the roof forms as defined by the longitudinal bar irrespective of the vertical misalignment of the trailer at the building site.

References Cited by the Examiner

UNITED STATES PATENTS 984,216    2/1911    Henderson _____ 25—131.6

ROBERT F. WHITE, *Primary Examiner.*

J. A. FINLAYSON, *Assistant Examiner.*